Figure 1:
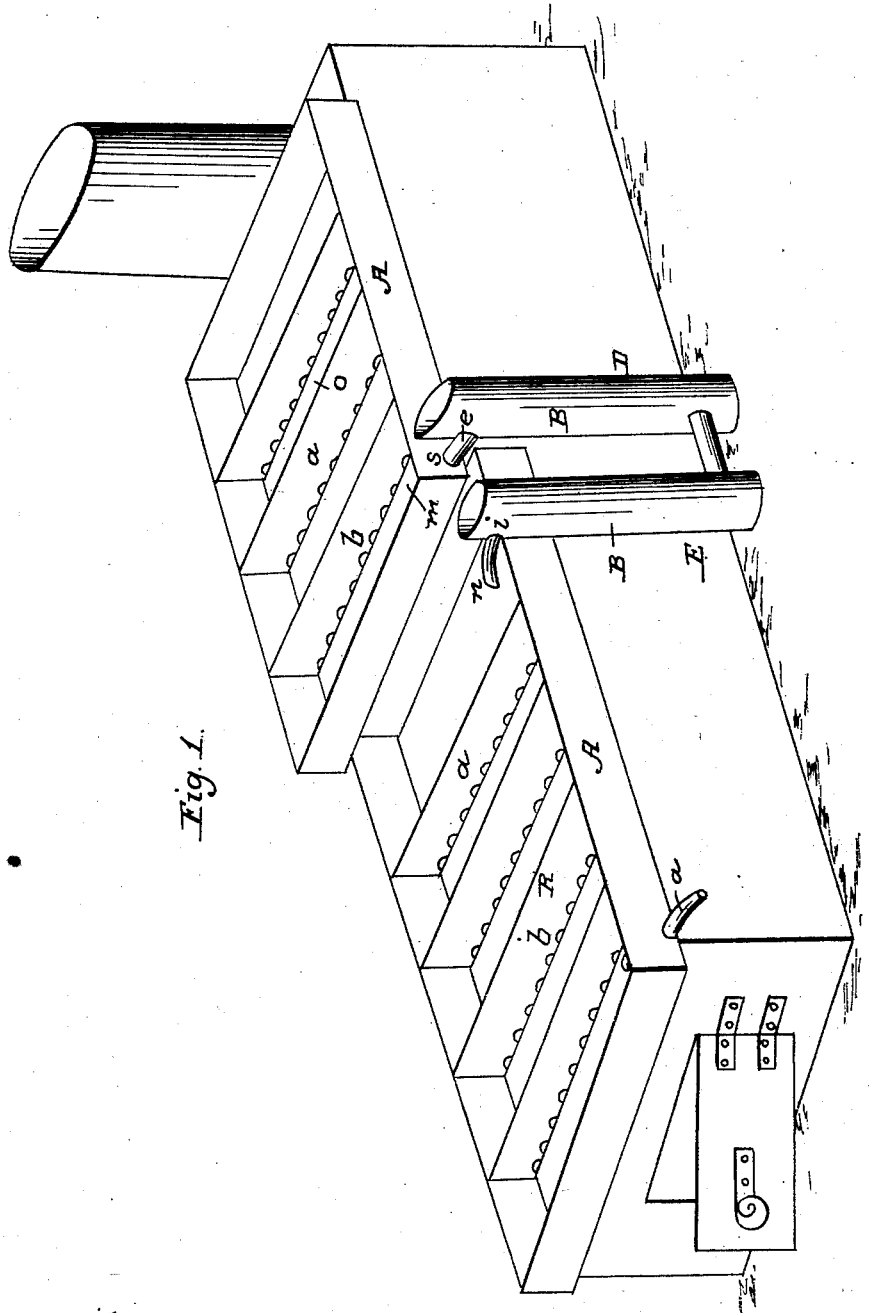

L. P. HARRIS.
Evaporating Saccharine Juices.

No. 28,477.

Patented May 29, 1860.

Witnesses:
M. Harris
J. W. Wilkinson

Inventor:
L. P. Harris

UNITED STATES PATENT OFFICE.

L. P. HARRIS, OF MANSFIELD, OHIO.

IMPROVEMENT IN APPARATUS FOR CLARIFYING AND EVAPORATING SACCHARINE JUICES.

Specification forming part of Letters Patent No. 28,477, dated May 29, 1860.

*To all whom it may concern:*

Be it known that I, L. P. HARRIS, of Mansfield, in the county of Richland, in the State of Ohio, have invented certain new and useful Improvements in Apparatus for Defecating and Evaporating Saccharine and other Juices; and I do hereby declare that the following is a full and exact description thereof, reference being had to the accompanying drawings, and to the letters of reference marked thereon.

The nature of my invention consists, first, in the construction and application of transverse or oblique partitions to defecating and evaporating pans, said partitions having a series of perforations or small openings in their lower edges, and being so arranged as to obstruct the onward motion of feculencies which rise to the surface during the process of heating and evaporating, while the liquid beneath it is allowed to pass freely onto the point of escape when drawn from the pan, substantially as hereinafter described and set forth; second, in the combination of a heating-furnace with defecating and evaporating pans, when said pans and furnaces are constructed and arranged substantially in the manner hereinafter described and for the purposes set forth; third, in the construction and arrangement of a double filter and its combination with heating and evaporating pans, substantially in the manner and for the purposes set forth.

To enable others skilled in the art to make and use my invention, I will proceed to describe its construction and operation.

I construct my furnace of the material ordinarily used for such purposes, and of a length sufficient to arrange both heater and evaporator thereon, when small-sized pans are used, as seen at A, Figure 1; but in larger apparatus a double furnace is preferable, the heater being elevated a number of inches above the evaporator, and the filters being properly arranged so as to convey the juice from the heater to the evaporator. The pans are constructed of metallic sheet—such as galvanized iron or protected copper. I then apply the partitions $a$ $a$, dividing the pans into a number of small apartments, the ends of said partitions being firmly attached to the sides of the pan. In the lower edge of said partitions I make a series of perforations or small openings, as seen at $b$ $b$.

The filters B B are constructed of metallic sheet or wood in the form of cylinders or boxes of any desired capacity, having their lower ends connected by a tube, as seen at $f$, so as to form a descending and an ascending branch. The descending branch D is provided with a tube, $e$, near the top, which connects it with the heater O, as seen at $s$. The ascending branch E is also provided with a tube, $i$, which connects it with the evaporator R, as seen at $n$.

I will now proceed to describe the mode of operating my invention. Having the pans properly arranged upon a single or double furnace, the heater O being elevated a number of inches above the evaporator, and the filter B so arranged that the descending branch is connected with the heater O, and the ascending branch connected with the evaporator R, a stream of juice is allowed to flow from a receiver onto the heater O. As it approaches the boiling-point a thick scum rises to the surface, and finer impurities are separated by the action of heat which are difficult to remove with a skimmer. I therefore raise the valve $m$, allowing the heated juice to flow gradually off into the descending branch of the filter at $s$, which is filled with appropriate substances to purify the juice and neutralize the acid therein. When it reaches the bottom of this branch of the filter, it flows through the tube $f$, (which may be long or short, according to the arrangement of the furnaces upon which the pans are set,) into the bottom of the ascending branch E, which is also filled with still finer material for purifying the juice, which, by hydrostatic pressure, is forced upward through this branch of the filter to the point $i$, from whence it flows into the evaporator at $n$, where the evaporation is completed and the sirup drawn off at $d$. The partitions are used as strainers to obstruct the onward motion of the scum on the surface, while the liquid beneath it passes gradually onward to the point of escape from the pan.

What I claim as my invention, and desire to secure by Letters Patent, is—

1. The double filter, when constructed substantially as described, and its combination with heating and evaporating pans, substantially as and for the purposes set forth.

2. An apparatus which affords facilities for heating, skimming, filtering, and evaporating saccharine and other juices, substantially as described, and for the purposes set forth.

L. P. HARRIS.

Witnesses:
M. HARRIS,
J. E. BARBOUR.